United States Patent

Johansen et al.

Patent Number: 5,812,313
Date of Patent: Sep. 22, 1998

[54] METHOD OF PROVIDING A MAGNIFIED IMAGE OF A PERIODICAL IMAGE PATTERN

[76] Inventors: Frithioff Johansen, Allegade 15C, DK-2000, Frederiksberg; Henrik Boetius, Bybaekterrasserne 167F, DK-3520, Farum, both of Denmark

[21] Appl. No.: 785,216

[22] PCT Filed: Jul. 22, 1993

[86] PCT No.: PCT/DK93/00247

§ 371 Date: Apr. 5, 1995

§ 102(e) Date: Apr. 5, 1995

[87] PCT Pub. No.: WO94/02874

PCT Pub. Date: Feb. 3, 1994

Related U.S. Application Data

[63] Continuation of Ser. No. 374,605, Apr. 5, 1995, abandoned.

[30] Foreign Application Priority Data

Jul. 23, 1992 [DK] Denmark .................................. 0952/92

[51] Int. Cl.[6] .............................. G02B 5/18; G02B 27/22; G02B 27/44; G02B 5/32

[52] U.S. Cl. ......................... 359/462; 359/463; 359/566; 359/619; 359/20

[58] Field of Search ............................. 359/40, 462, 619, 359/625, 626, 566, 567, 478, 20, 463

[56] References Cited

U.S. PATENT DOCUMENTS

| | | | |
|---|---|---|---|
| 2,401,271 | 5/1946 | Suner | 359/478 |
| 3,597,042 | 8/1971 | Favre | 359/478 |
| 4,158,481 | 6/1979 | Hoyer | 359/478 |
| 4,621,897 | 11/1986 | Bonnet | 359/462 |
| 4,878,735 | 11/1989 | Vilums | 359/462 |
| 4,927,238 | 5/1990 | Green et al. | 359/478 |
| 5,379,133 | 1/1995 | Kirk | 359/462 |

FOREIGN PATENT DOCUMENTS

| | | | |
|---|---|---|---|
| 4107528 | 4/1992 | Japan | 359/40 |

*Primary Examiner*—Jon W. Henry
*Attorney, Agent, or Firm*—Cushman Darby & Cushman IP Group of Pillsbury Madison & Sutro LLP

[57] ABSTRACT

Method and display for providing a magnified image of a two-dimensional, periodic image pattern. An apertured sheet is arranged in front of the two-dimensional, periodic image pattern preferably being in a plane B and preferably in distance therefrom, the apertured sheet preferably also being in a plane A and in any direction to the plane having a center distance between the apertures, which almost corresponds to the center distance in the same direction in the plane B containing the periodic image pattern. As a result, a magnified image of the individual image element of the image pattern is obtained. Moreover, a stereoscopic depth effect may be obtained, if the apertured sheet and the image pattern are in different planes.

5 Claims, 7 Drawing Sheets c is positive

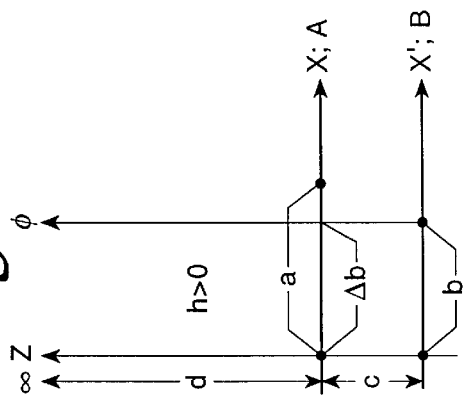
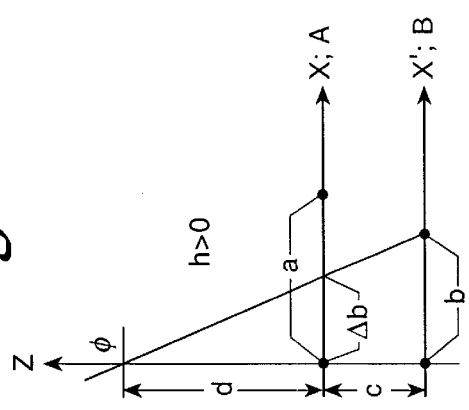
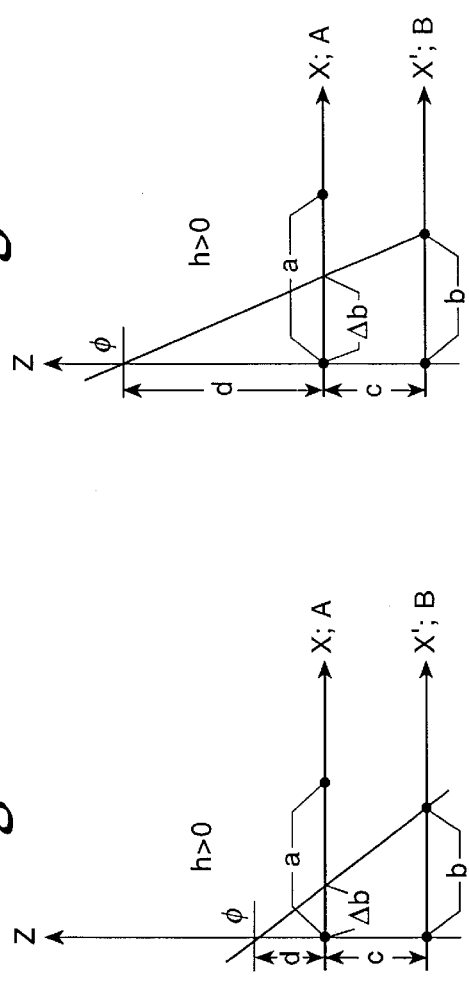
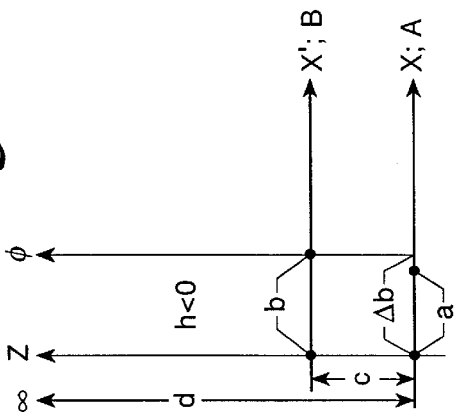
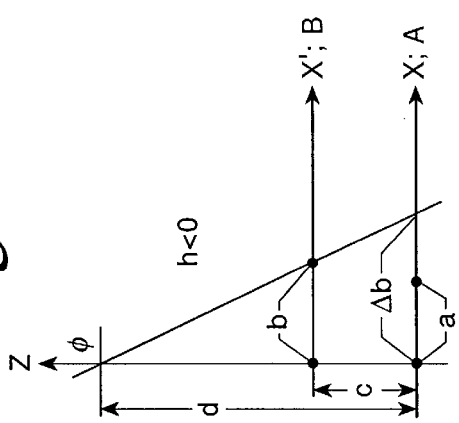
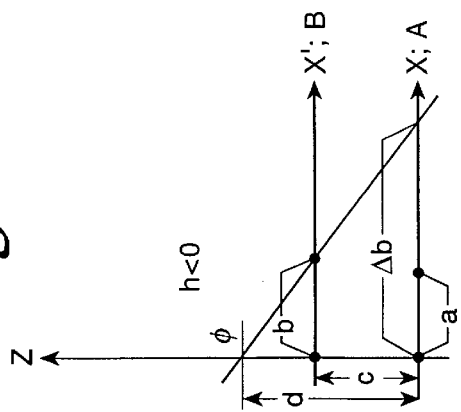

METHOD OF PROVIDING A MAGNIFIED IMAGE OF A PERIODICAL IMAGE PATTERN

This is a continuation of application Ser. No. 08/374,605, filed Apr. 5, 1995, which was abandoned upon the filing hereof.

TECHNICAL FIELD

The invention relates to a method of providing a magnified image of a periodical image pattern on a preferably plane surface.

BACKGROUND ART

U.S. Pat. No. 4,878,735 discloses an optical imaging system comprising a first plate with equidistantly arranged diffraction elements in the form of lenses. After the first plate with equidistantly arranged diffraction element, a further plate also with equidistantly arranged diffraction elements is arranged. The plates are placed in parallel. By means of the first plate, a plurality of images of an object in an image pattern is formed. The centrally arranged images of the object are smaller than the peripherally arranged images of the same object. By means of the plurality of images, which at least partially correspond to a periodic image pattern, and the subsequent plate a magnified image of each of the images in the image pattern is generated. However, a perspective image of the object is not obtained by this image generation and two images are seen, if the almost periodic image pattern is viewed upon with two eyes through the second plate. Thus, the known system is unable to give a spatial impression with a depth effect.

SUMMARY OF THE INVENTION

The object of the invention is to show how to obtain a correct spatial image and, according to the invention, this object is obtained by an apertured sheet with diffraction or refraction elements, such as lenses or openings, being arranged in front of the image pattern and preferably at a distance therefrom, the apertured sheet preferably being in a plane and in a given direction to the plane having a center distance between the elements, which is different from, but almost corresponds to the center distance in the same direction on the plate containing the periodic image pattern, the apertured sheet being slightly turned relative to the image pattern.

The accurate periodicity provides the spatial effect of one image (a stereoscopic image) when the arrangement is viewed upon with two eyes. The advantage of the center distance of the periodical image pattern being slightly different from the center distance of the apertured sheet is that it is not necessary to stand indefinitely far away from the arrangement.

The invention further relates to a use of the method according to the invention for providing a magnified image of a periodic image pattern, which may be exposed. According to the invention, an apertured sheet with diffraction or refraction elements, such as lenses or openings, is arranged in front of the periodic image pattern and preferably in distance therefrom, the apertured sheet preferably being in a plane and in a given direction to the plane having a center distance between the elements, which is different from, but almost corresponds to the center distance in the same direction on the plate containing the periodic image pattern.

BRIEF DESCRIPTION OF THE DRAWINGS

The invention is described in greater detail in the following, with reference to the accompanying drawings, in which:

FIGS. 13 to 18 an illustration of the influence of the distance d on the projection Δb, and FIG. 19 an illustration of a stereoscopic image plane and a virtual image and the generation of a stereoscopic image in this plane.

DETAILED DESCRIPTION

By means of a moiré effect, two interfering structures form a new structure. If one of the structures acts as a reference for the other structure, a very sharp, magnified image of the second structure is generated. If the interfering structures are in the same plane, the generated magnified image will be in the same plane as the interfering structures. If the interfering structures are in different planes, a virtual image arranged therebehind is generated. At the same time, a stereoscopic depth effect is obtained, which is explained in the following.

Figure 1:
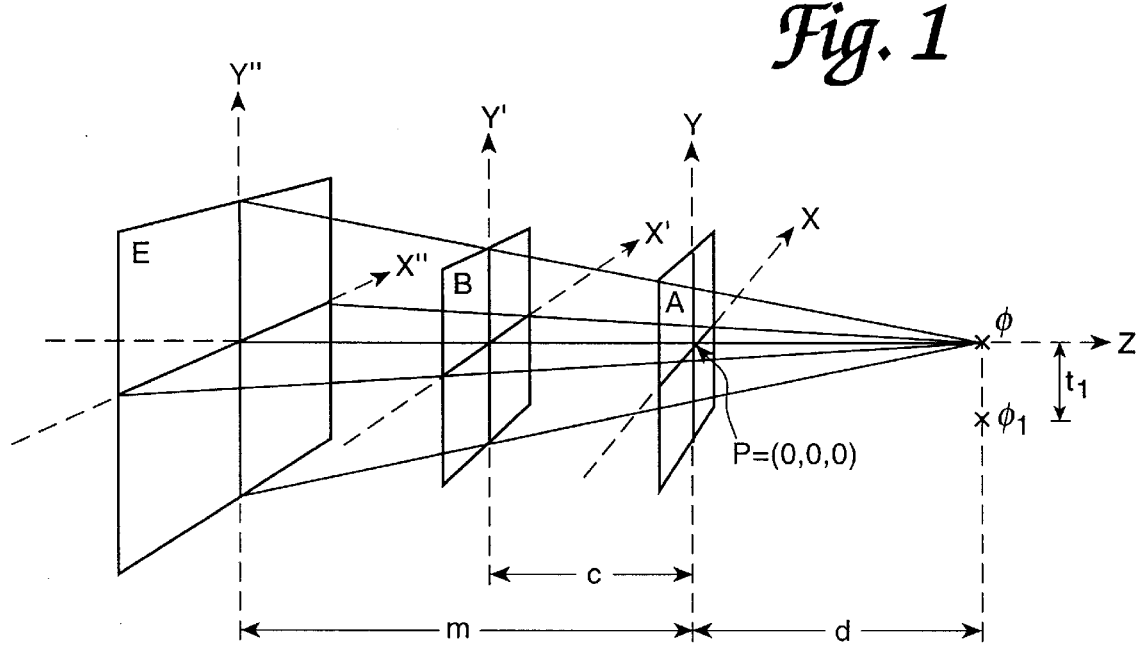
FIG. 1 illustrates an arrangement according to the invention for providing a magnified image of a two-dimensional periodic image pattern comprising a plane containing the image pattern and a plane containing a perforated apertured sheet.

FIG. 1 shows a plane B comprising a periodic image pattern. The plane B has the coordinate axes X' and Y'. In front of the plane B, a plane A is arranged comprising an apertured sheet with diffraction or refraction elements, such as lenses or openings. The plane A has the coordinate axes X and Y.

Figure 2:
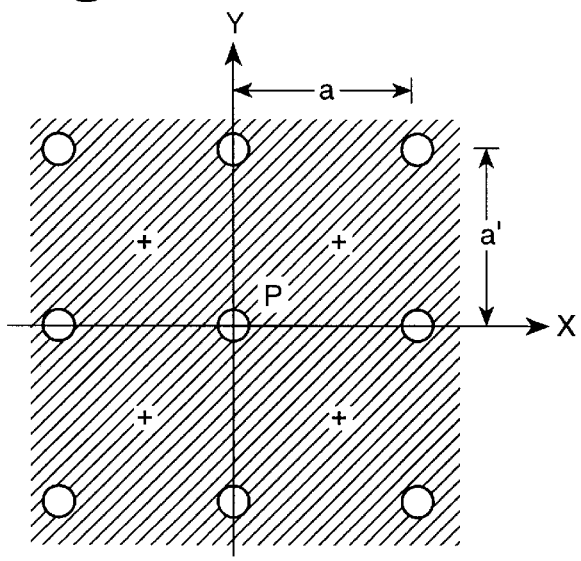
FIG. 2 is an example of an apertured sheet on a large scale.

The apertures in the plane A have a center distance a in the direction of the X axis and a' in the direction of the Y axis, compare FIG. 2. The distances a and a' are not necessarily of equal size. In practice, there is a plurality of apertures. However, for the sake of clarity, only a few apertures are shown. The plane A is called the aperture plane. It is assumed in the following that the apertures are very small and may be regarded as dots. This approximation is reasonable.

Figure 3:
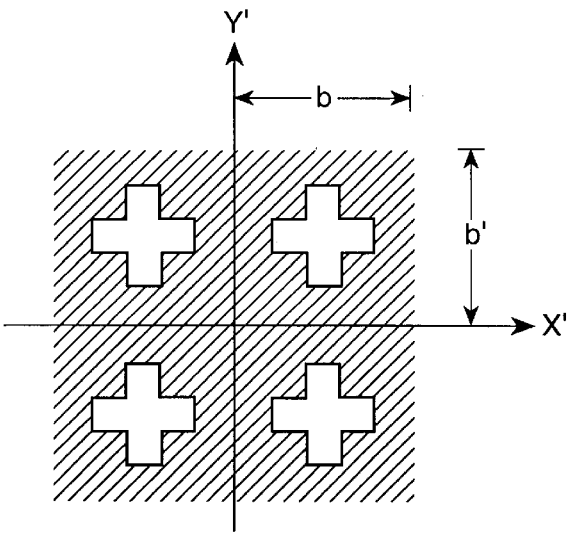
FIG. 3 is an example of an image pattern on a large scale.

The image elements in the plane B have the length b in the direction of the X axis and the length b' in the direction of the Y axis, confer FIG. 3. The lengths b and b' are not necessarily of equal size.

The planes are in a three-dimensional system of coordinates having the axes X, Y, Z. The point P has the coordinates (0,0,0). The plane A makes up the set of points of Z=0. The plane B makes up the set of points of a value of Z, which in the present case is different from 0. The aperture plane A is a reference plane for one or several image pattern planes. However, the following calculations only apply to one image pattern plane, B.

The X' and Y' axes in the plane B may be pivoted about the Z axis. This is not included in the calculations.

The relations between the center distances and the lengths, respectively, of the aperture structures and the image structures are:

$$\frac{a}{a'} = \frac{b}{b'}$$

This is necessary in order to obtain a distortionless magnified image.

The Position of the Structures in Relation to the X and Y Axes in the Arrangement Illustrated in FIG. 1

In the plane A, P is the center of an opening—compare FIG. 2. The Z axis passes through P. In the plane B the Z axis passes through a point, wherein the corners of four image elements abut, compare FIG. 3. This implies that from the viewing point on the Z axis, the viewer looks along the Z axis through the opening with center in P and toward a point in the plane B, wherein the corners of the four image elements abut. This is the basis for the calculation of the resulting interference image.

By an interference image an image generated by means of two mutually interfering structures is meant, in the present case the structures in the planes A and B.

The Y axis is not included in the mathematical derivation or the interference image, the relations between Z and Y corresponding to the relations between Z and Y.

Figure 4:
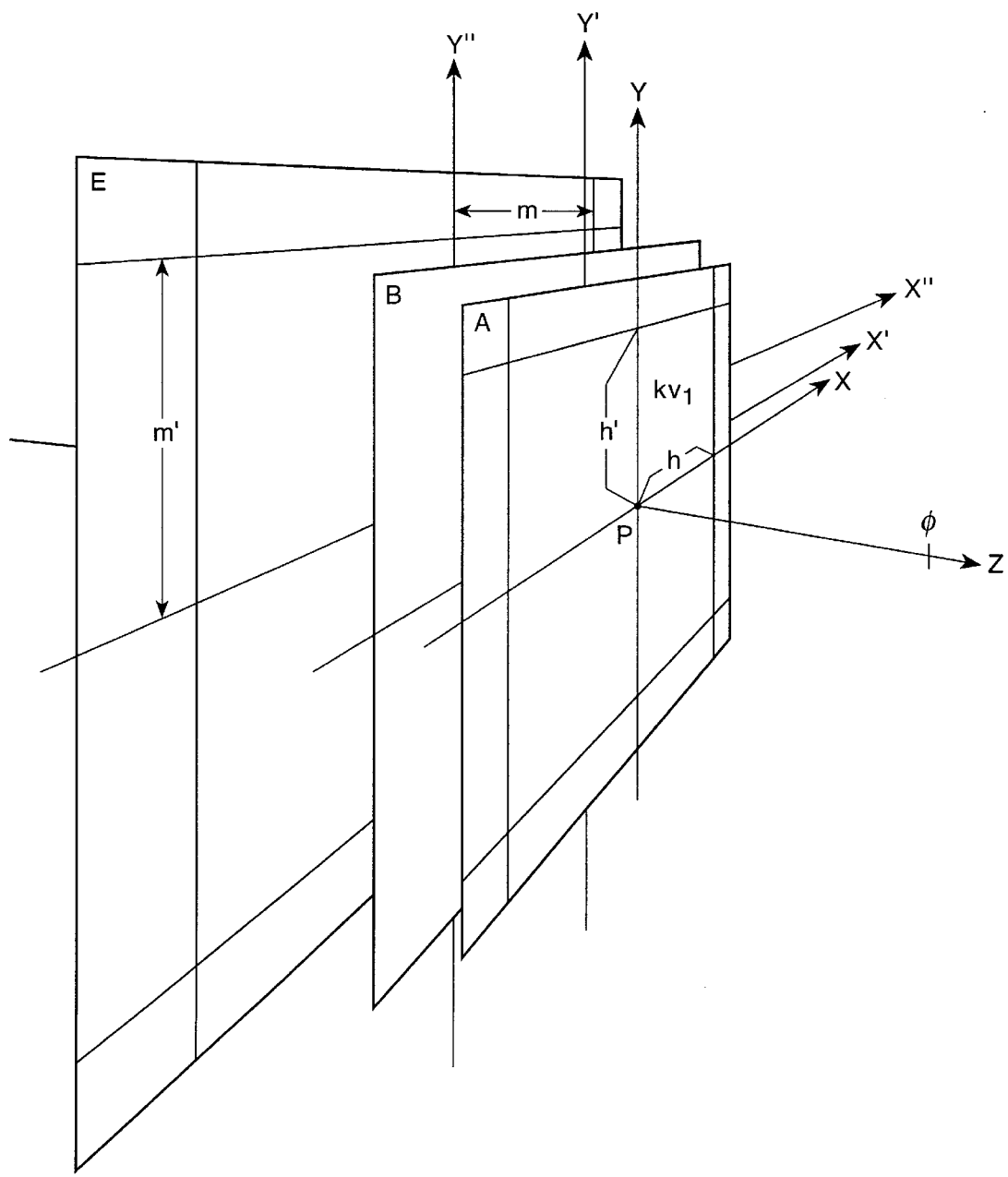
FIG. 4 is a perspective view of the arrangement illustrated in FIG. 1, FIGS. 5a, 5b, 5c illustrate the structures of the openings in the aperture plane.
Figure 5A:
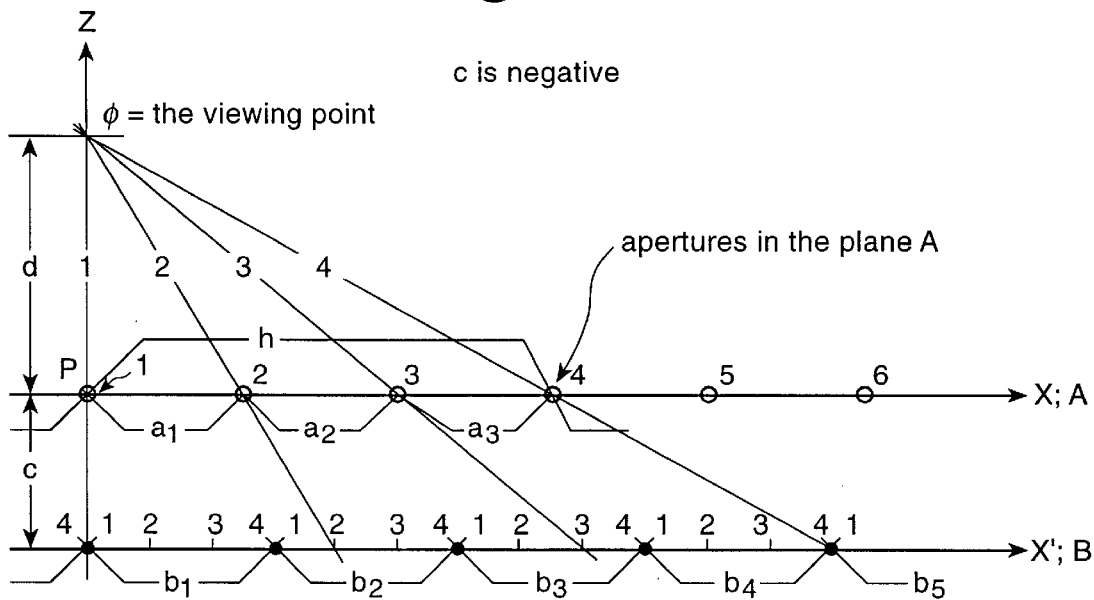
Figure 5B:
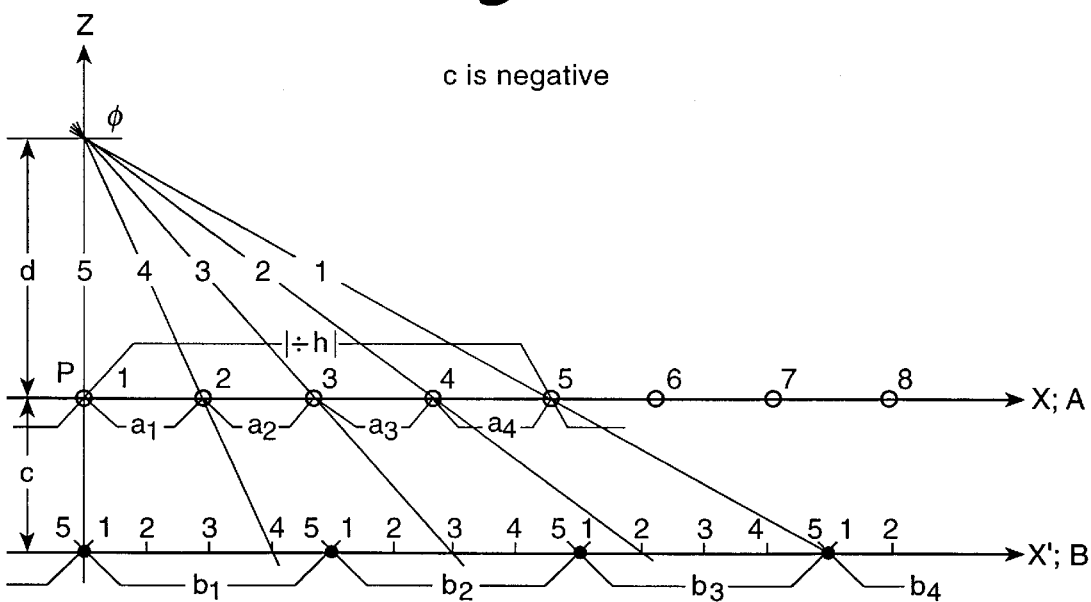

As a center projection on the plane A with center in the point Ø the interference image is referred to as h, compare FIGS. 4, 5a, and 5b. The interference image is measured in plane A.

Figure 5C:
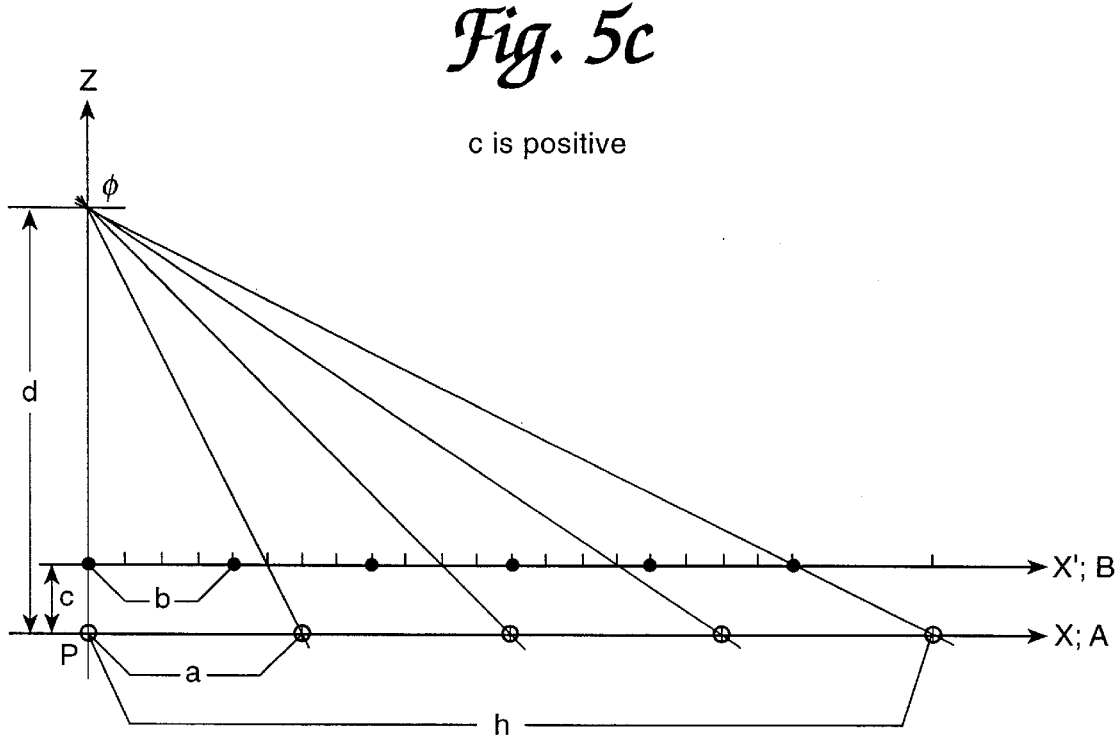

FIGS. 5a, 5b, and 5c illustrate the structure of the openings in the aperture plane A as dots with the distance a in the direction of the X axis. The image structure is seen as lengths of the value b between dots in the plane B. The Z axis passes in between two image elements b in the first and in the second quadrant of the plant B.

The distance from the viewing point Ø to the reference plane A is referred to as d, always having a positive value on the Z axis, respectively, compare FIG. 1.

The distance c between the planes A and B is a value on the Z axis, which may be positive as well as negative, compare FIGS. 1, 5a, 5b, and 5c.

Reference is now made to FIG. 5a. The viewing is made from the point Ø. Through the opening No. 1 in the plane A, a dot of an image element $b_1$ in the plane B is viewed. This dot is referred to as 1. Through the opening No. 2, a dot of an image element $b_2$ is viewed. This dot is referred to as 2. Through the opening No. 3, a dot of an image element $b_3$ is viewed. This dot is referred to as 3. Through the opening No. 4, a dot of an image element $b_4$ is viewed. This dot is referred to as 4. The dot 4 is further a dot in the an image element $b_5$, which is referred to as 1.

The relative positions of the viewing points in the image elements $b_1$, $b_2$, $b_3$, and $b_4$ (FIG. 5a) may be transferred for all b ($b_1$, $b_2$, $b_3$, $b_4$). The dots are shown in FIG. 5a. At the viewing of $b_1$ . . . $b_4$ through the openings in the plane A linear information about b is obtained. Thus, a magnified image of b is thus viewed from the point Ø. The magnified image of b seen as a center projection on A with Ø as center is referred to as the interference image h (in the plane A). The interference image h is measured in the plane A. The measuring may alternatively be made in plane b, but as there may be an additional image plane, it is most advantageous to use A as reference plane, as there is only one aperture plane.

The size of the interference image in the plane A is n·a. Thus, $$\frac{h}{a} = n$$

is obtained.

The size of the interference image in the plane B comprises a number of b. Compared to the number of a in h, the n is the number of b in the corresponding interference image in the plane B is equal to n+1, which is evident from FIG. 5a. Thus, the size of the interference image as center projection on the plane B is (n+1)h.

Reference is made to FIG. 5b, wherein d denotes the distance to the viewing point Ø. In the present case, the relation among a, b, and d implies that the interference image h is turned 180° relative to the individual image element b, which is seen by viewing the sequence of the readings from Ø of the dots in b. In the present case, the sequence of readings is reversed in relation to FIG. 5a. In a mathematical sense, this means that the size of the interference image is negative.

If h is negative, it is still illustrated on the positive side of the X axis, but h is then registered as |–h| corresponding to the X axis and Y axis having been turned 180° relative to the X' axis (and Y' axis) in the image plane B.

1) The size of the interference image in the plane A is n·a as shown in FIG. 5a.

2) The size of the interference image in the plane B is a number of b.

Compared to the number of a in h, the number of image elements b in the interference image in the plane B is equal to n–1. Thus, the size of the interference image in the plane B is (n–1)·b.

Reference is now made to FIG. 5c. In the present case c is positive, (which is different from c in FIG. 5a and 5b) corresponding to the image structure being in front of the aperture structure. In practise, this results in a decreased image quality. In principle, however, the same takes place. The light comes from behind through the openings in the aperture structure and passes the image structure in the sequence of image elements b and reaches the viewing point Ø. In the present case, the interference image h is positive corresponding to the X axis (and the Y axis) having the direction as in the image plane B.

The number of a in h is n. It may said that a magnified n times is equal to b, but as a is not the image, but merely the reference, the interesting magnifying factor is thus the magnification of b. In order to magnify the image element b in the plane B, n has to be multiplied by b. Thus, the magnification factor of a/b in the plane B is $$\frac{a \cdot n}{b}.$$

Figure 6:
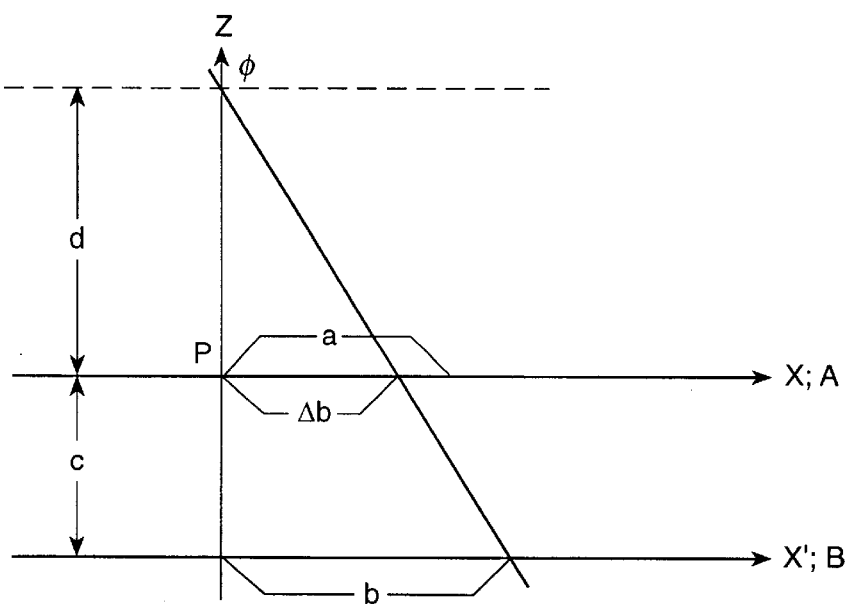
FIG. 6 is an illustration of how the length b of each image element is calculated.
Figure 11:
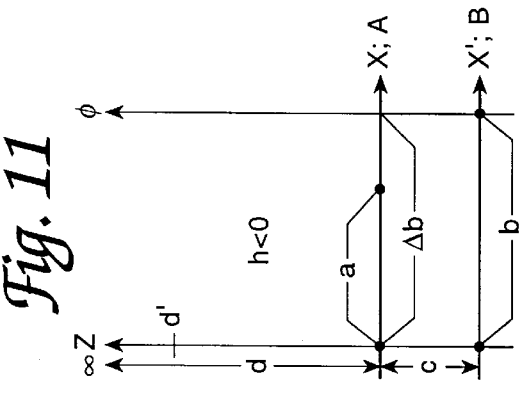
FIGS. 7 to 12 are illustrations of, how the distance d between the viewing point and the aperture plane influences Δh (the length b projected onto the aperture plane A), when the distance c between the aperture plane and the image plane is negative, and a is smaller than the length b, or when the distance c is positive and a is larger than the length b.
Figure 12:
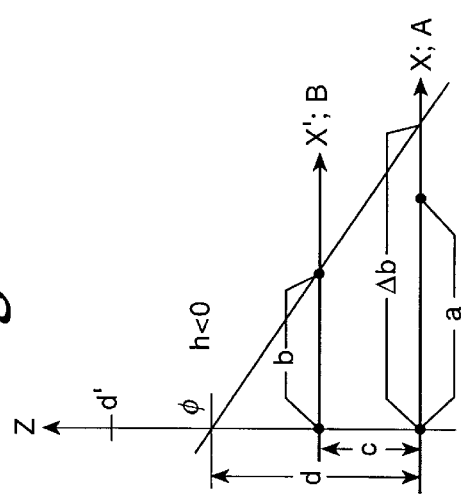
Figure 9:
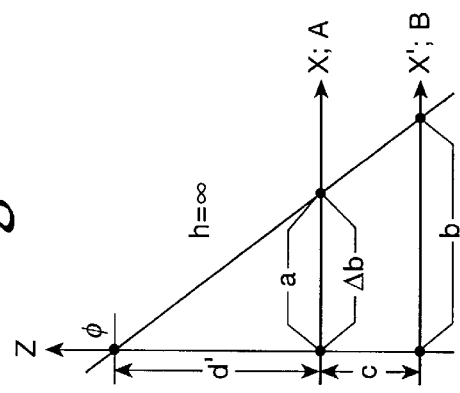
Figure 10:
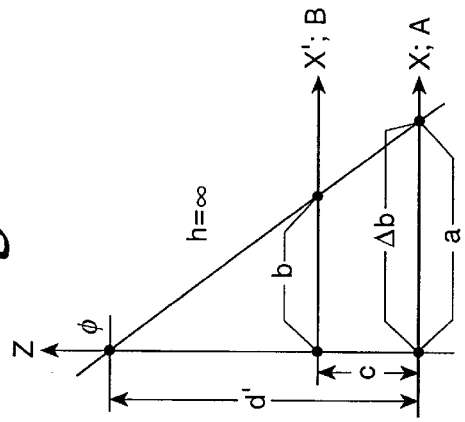
Figure 7:
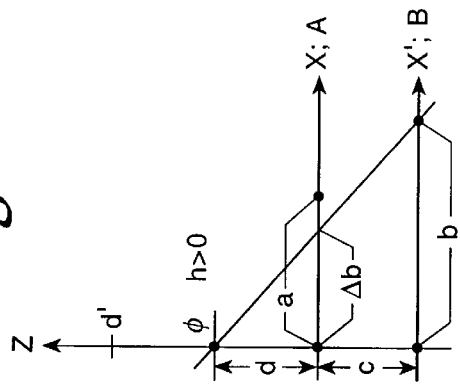
Figure 8:
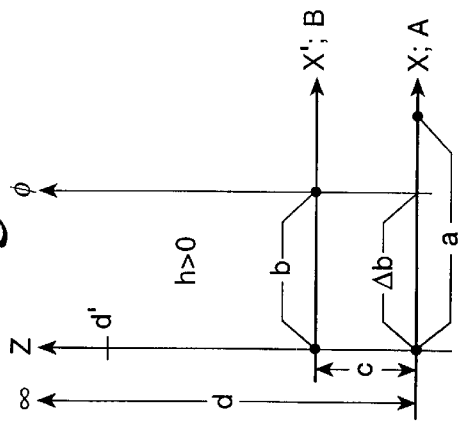

Reference is now made to FIG. 6 illustrating how b is calculated from set values of a, h, d, and c. Δb is the center projection of b on A with centre in the point Ø.

$$\Delta b = \frac{|h|}{n+1}$$

when the X and Y axes in the virtual image plane E have the same direction as in the planes A and B, and $$\Delta b_1 = \frac{|h|}{n-1}$$

when the X and Y axes in the virtual image plane E is turned 180° relative to the X and Y axes in the planes A and B.

For determination of b for a set of values of c and d (c is negative) the following equation can be deduced from FIG. 6.

$$\frac{d}{\Delta b} = \frac{a-c}{b} \Rightarrow b = \frac{\Delta b(d-c)}{d} \Rightarrow$$

$$b = \frac{|h| \cdot (d-c)}{(n-1)d}$$

$\Delta b$ may be found, when c, d and b are known.

$$\frac{d}{\Delta b} - \frac{d-c}{b} \Rightarrow \Delta b = \frac{b \cdot d}{d-c}$$

h may be found, when a and $\Delta b$ are known.

$$h = \left( \frac{a}{a - \Delta b} - 1 \right) \cdot a \Rightarrow$$

$$h = \frac{a \cdot \Delta b}{a - \Delta b}$$

If c=0, it can be shown that $$h = \frac{a+b}{a-b}$$

By replacing b with $\Delta b$, c and d are indirectly inserted into the formula for h. At the same time, h becomes a virtual image, compare FIG. 19 unlike the case, wherein c=0.

According to the above formula $$h = \frac{a \cdot \Delta b}{a - \Delta b}$$

Reference is now made to FIGS. 7 to 12 illustrating how the distance d influences on $\Delta b$, when c is negative and a is smaller than b, and when c is positive and a is larger than b.

d' is the distance to the viewing point Ø corresponding to h being infinitely large.

h>0 means that the X and Y axes are located as in plane A.

h<0 means that the X and Y axes are turned 180° relative to the X and Y axes in plane A.

If d' is negative, d loses its importance, as it then is located incorrectly relative to the plane A.

$$\frac{c}{h-a} = \frac{d'}{a} \rightarrow d' - \frac{c \cdot a}{b-a}$$

If c is positive (FIGS. 8, 10, 12), the equation for d' is $$\frac{c}{a-b} = \frac{d'}{a} \Rightarrow d' = \frac{c \cdot a}{a-b}$$

Reference is now made to FIGS. 13 to 18 illustrating the influence of d' on $\Delta b$, when a>b and c<0 or a<b and c>0.

In these cases, h retains its sign independently of d, however d cannot be negative.

Figure 19:
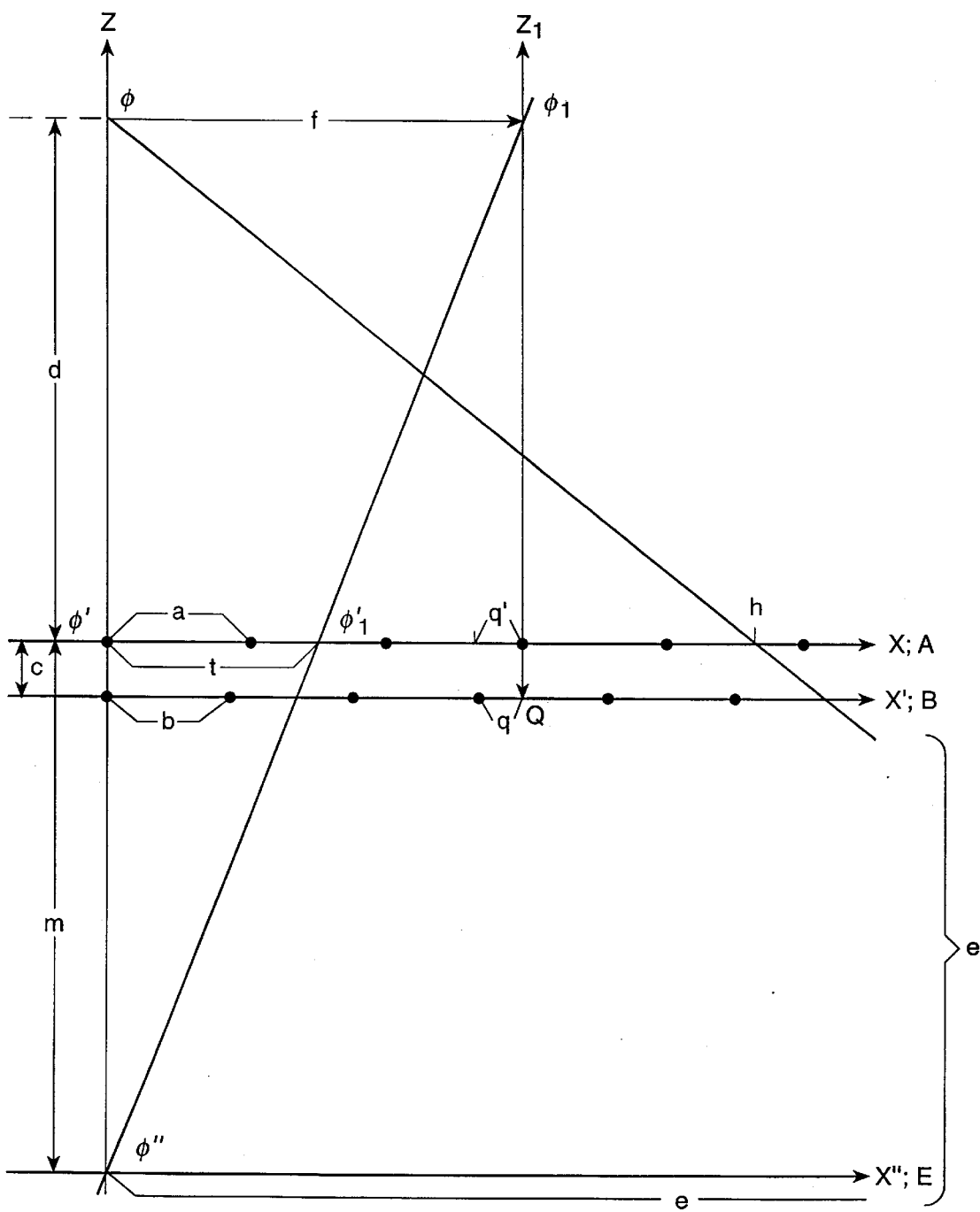

Reference is now made to FIG. 19 illustrating the virtual image plane E and how a stereoscopic, virtual image is generated in said plane.

Ø and $Ø_1$ are viewing points of two eyes, t is the distance between two virtual images seen from Ø and $Ø_1$, respectively, as center projections on the plane A. If the line of view is drawn from Ø through Ø' in the plane A, and from $Ø_1$ through $Ø_1$' in the plane A backwards, the lines are joined in the point Ø" in the plane E, which is the virtual image plane. The distance between the planes A and E are named m. h projected onto the plane E from the viewing point Ø is named e. The distance between the points Ø and $Ø_1$ is named f.

The distances f–t and m are determined in the following manner.

The $Z_1$ axis, which is parallel to the Z axis and passes through $Ø_1$, reaches a point Q in an image element b in the plane B. The point Q has the same relative location as in the interference image seen from $Ø_1$. The point Q is found in the distance f from the edge of the image element nearest the Z axis.

$$q = \frac{(a-b) \cdot f}{a}$$

Dimensioning of f–t is thus obtained.

When q is to be used for dimensioning f to t, the equivalent value q' is to be found in the plane A. This is made by multiplying q with b.

This implies that $$q' = \frac{(a-d) \cdot f}{b}$$

For calculation of f–t (in the plane A), q' is to be multiplied by a. This implies that $$f - t = \frac{(a-b) \cdot f \cdot h}{b \cdot a} \Rightarrow$$

$$t = f - \frac{(a-b) \cdot f \cdot h}{b \cdot a}$$

The values for t, d, and f are inserted into the following equation:

$$-\frac{m}{t} = \frac{d}{f-t} \rightarrow m = -\frac{d \cdot t}{f-t} = -\frac{d}{f}$$

Calculation of b and c from a, h, d, f, and m

As the relation between b and c are included in the values for m, b and c may be calculated in the following manner:

1) t is found from f, d, and e, $$-\frac{m}{t} = \frac{d-m}{f} \Rightarrow t = -\frac{f \cdot m}{d-m}$$

2) q' is found from the equation for t, f, a, and h:

$$q' = \frac{(f-t) \cdot a}{h}$$

3) b is calculated in the following manner $$\text{As } q' = q \cdot \frac{a}{b} \quad q = \frac{(a-b) \cdot f}{a} \text{ then}$$

-continued
$$q' = \frac{(a-b) \cdot f}{b} \Rightarrow b - \frac{a \cdot f}{q' + f}$$

4) c is calculated in the following manner $$\frac{d}{\Delta b} = \frac{d-c}{b} \Rightarrow c = d - \frac{d \cdot b}{b\Delta}$$

5) At reduction to one equation the following is obtained:

$$c = d - \frac{d \cdot f \cdot a}{\frac{\left(f + \frac{f \cdot m}{d - m}\right) \cdot a}{h} + f}$$

The size of the interference image in the plane E is equal to e. The relation appears from FIG. 19, and the following is obtained $$\frac{d-m}{e} = \frac{d}{h} \Rightarrow e = \frac{h(d-m)}{d}$$

The apertures in the apertured sheet preferably have an opening area of less than 10%, whereby a sufficiently sharp and yet sufficiently luminous image is obtained. The openings may be polygonal or elliptical, possibly circular. They merely have to be essentially uniform.

The display generated by means of the method according to the invention may for instance be used in connection with road signs, thus utilizing the fact that the size of the virtual image is essentially independent of the distance, whereby it is easier to see the sign from a great distance. The problem is often that the sign is not noticed and it is too late to turn away from, for instance, the motorway.

The display according to the invention may also be used in connection with luminous sign boxes for stores. The logo of the store may thus be seen from a greater distance.

Moreover, in connection with illumination advertisements the display according to the invention has great potentials, inter alia as the stereoscopic effects make people curious and eye-catching. It should be noted that the image pattern and the apertured sheet are not necessarily arranged on planar surface. They may alternatively be on curved surfaces, such as cylinder surfaces or spherical surfaces, in which case completely new forms of imagery are generated.

The display according to the invention may further be used in connection with lamp shades.

The surfaces for the image pattern and the apertured sheet, respectively, may further be mutually slidable, whereby quite unique visual impressions are created, which first and foremost may be used in connection with billboards.

The openings in the apertured sheet may alternatively be replaced by lenses.

We claim:

1. A method for providing a magnified image of a periodic image pattern on a surface, comprising:

providing an apertured sheet having one of a regular, two-dimensional array of diffraction elements and a regular, two-dimensional array of refraction elements, arranged in a given pattern;

arranging said apertured sheet so as to be spaced a distance in front of an image composed of a regular, two-dimensional array of image elements arranged in said given pattern, said elements of said apertured sheet being arranged on centers that are slightly closer to one another than corresponding ones of said image elements in two mutually orthogonal directions, so that said given pattern of image elements is viewable through said given pattern of elements of said apertured sheet from in front of said apertured sheet;

both said apertured sheet and said image being substantially planar and located in respective planes which are arranged parallel to one another with said given pattern of elements and said given pattern of image element relatively rotated about an axis normal to both said planes such that respective said orthogonal directions thereof are disposed at from 3 to 5 degrees to one another.

2. The method of claim 1, wherein:

said elements of said apertured sheet are openings.

3. The method of claim 2, wherein:

said openings are polygonal.

4. The method of claim 2, wherein:

said openings collectively occupy less than 10 percent of the surface area of the front of said apertured sheet.

5. The method of claim 1, wherein:

said elements of said apertured sheet are lenses.

* * * * *